Aug. 23, 1960 H. A. LOZO 2,949,940
BATTERY PLATE PASTING MACHINE
Filed July 5, 1955 7 Sheets-Sheet 1
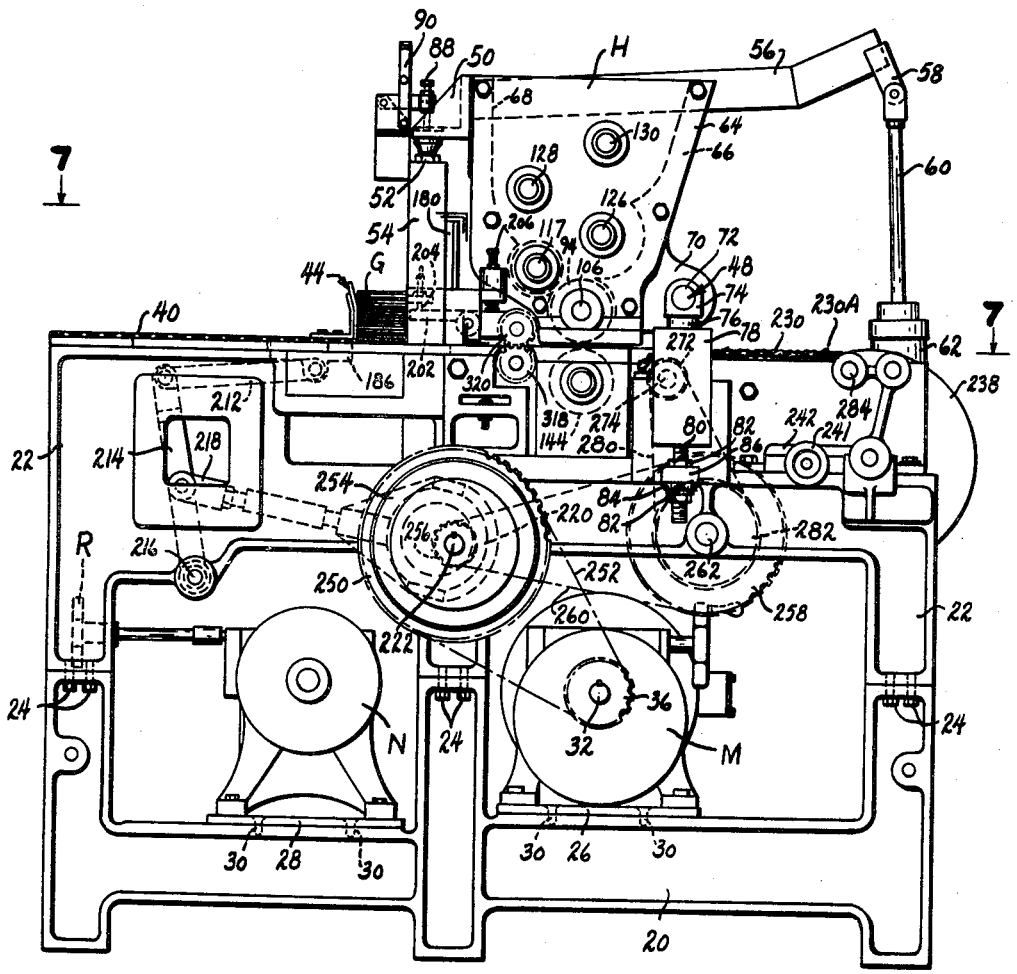
Fig. 1
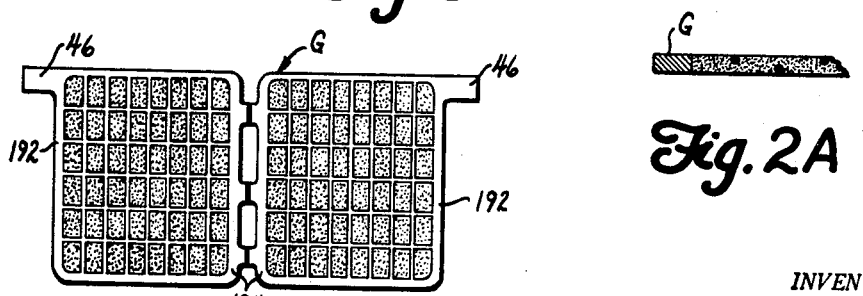
Fig. 2
Fig. 2A
INVENTOR.
HAROLD A. LOZO
BY
Falvey, Souther & Stoltenberg

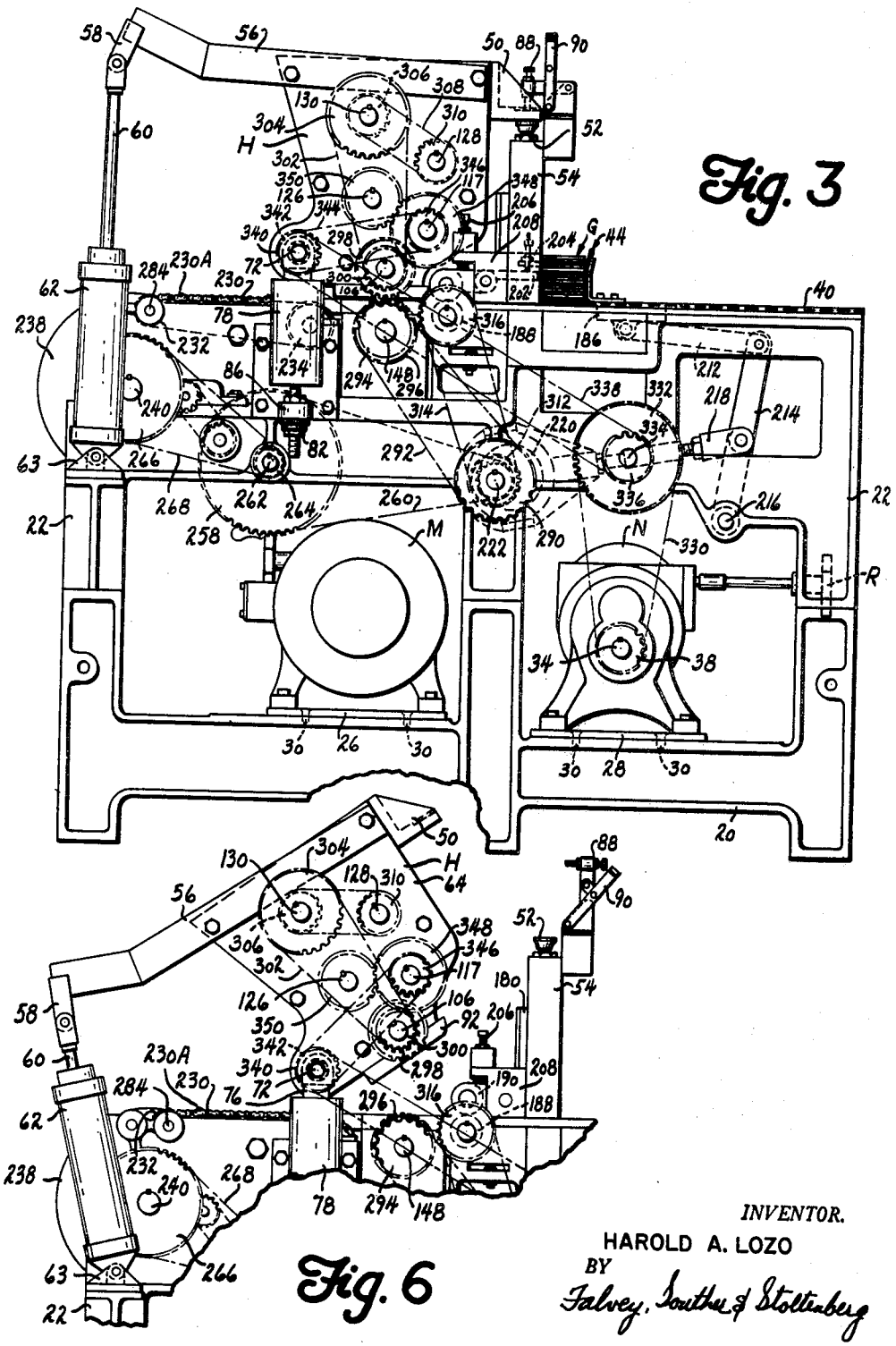

Aug. 23, 1960
H. A. LOZO
2,949,940
BATTERY PLATE PASTING MACHINE
Filed July 5, 1955
7 Sheets-Sheet 3
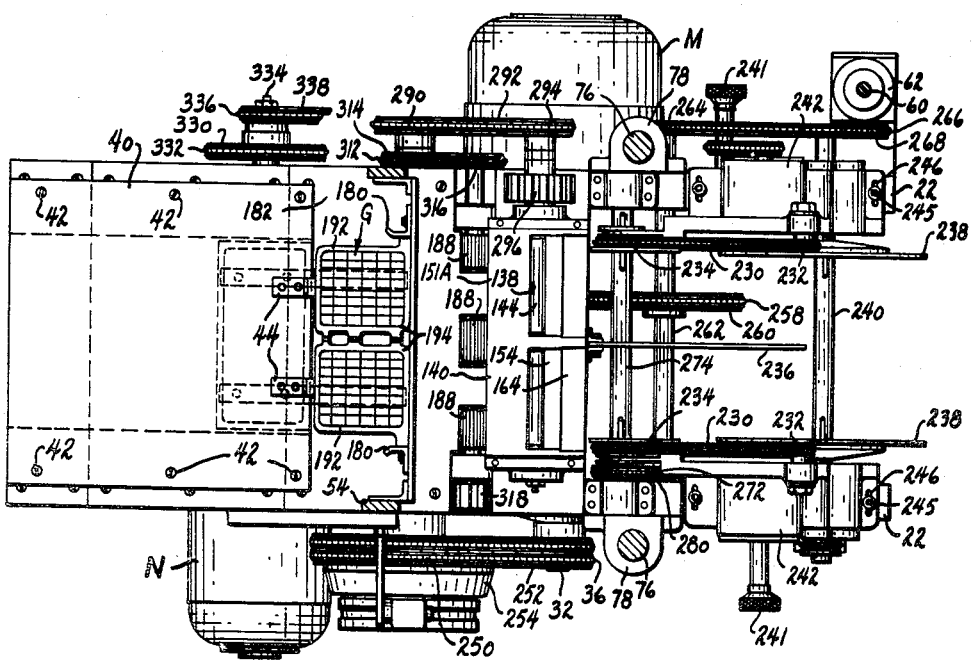
Fig. 7
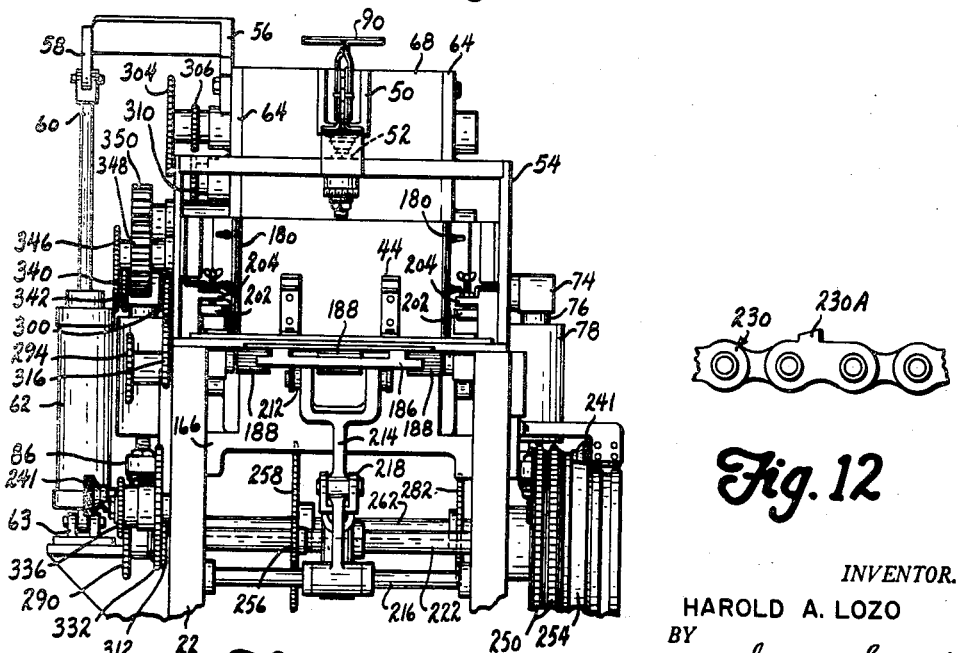
Fig. 4
Fig. 12
INVENTOR.
HAROLD A. LOZO
BY
Falvey, Souther & Stoltenberg

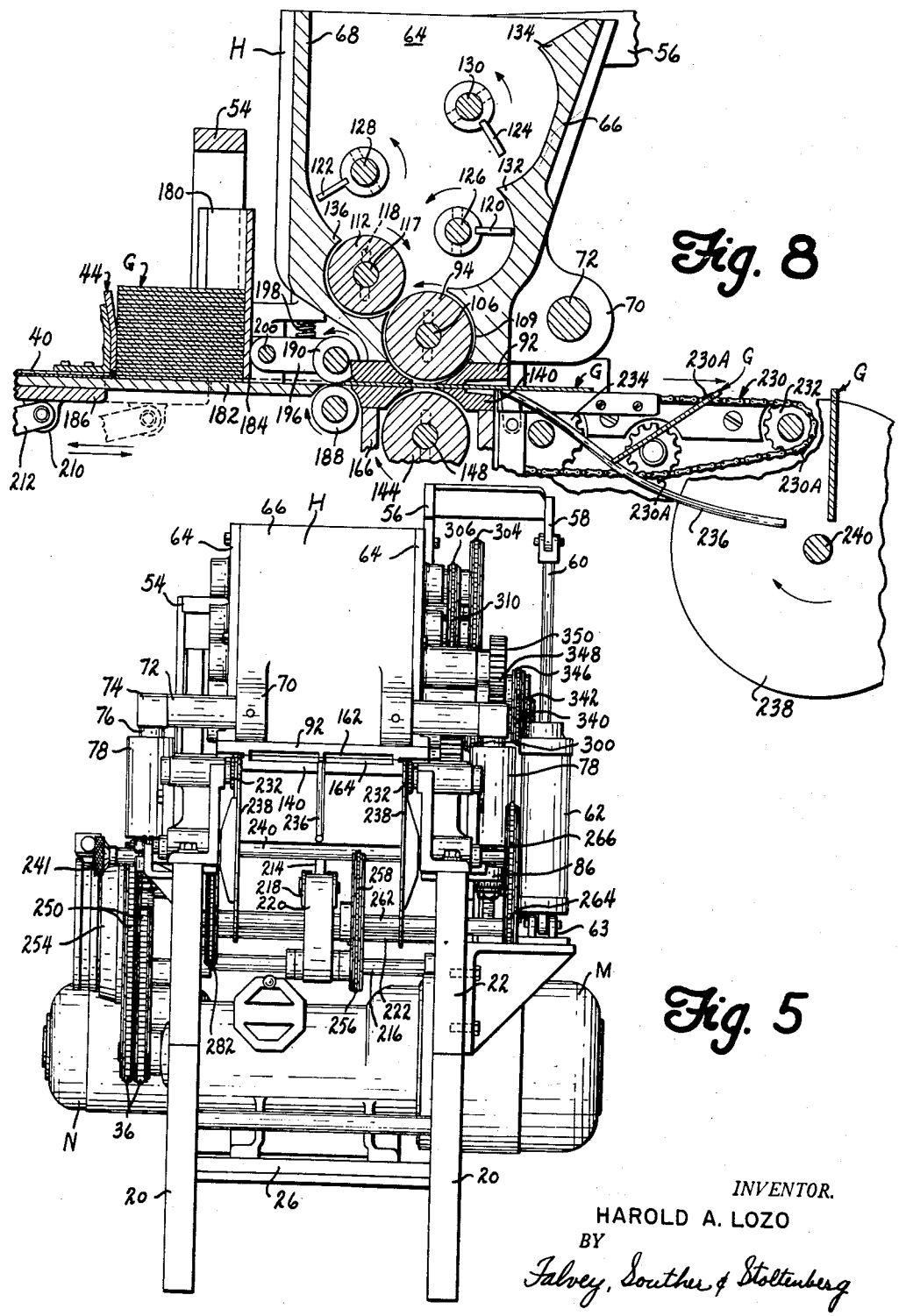

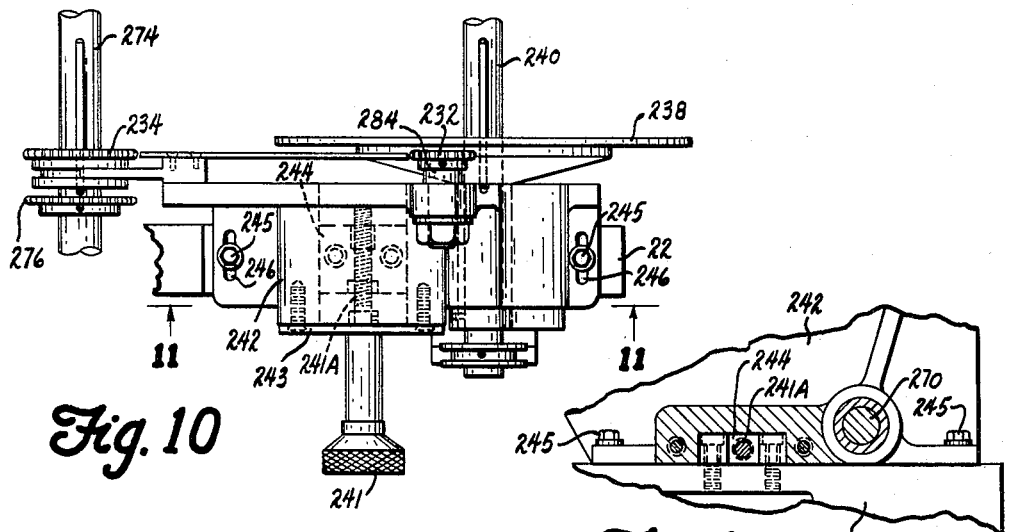
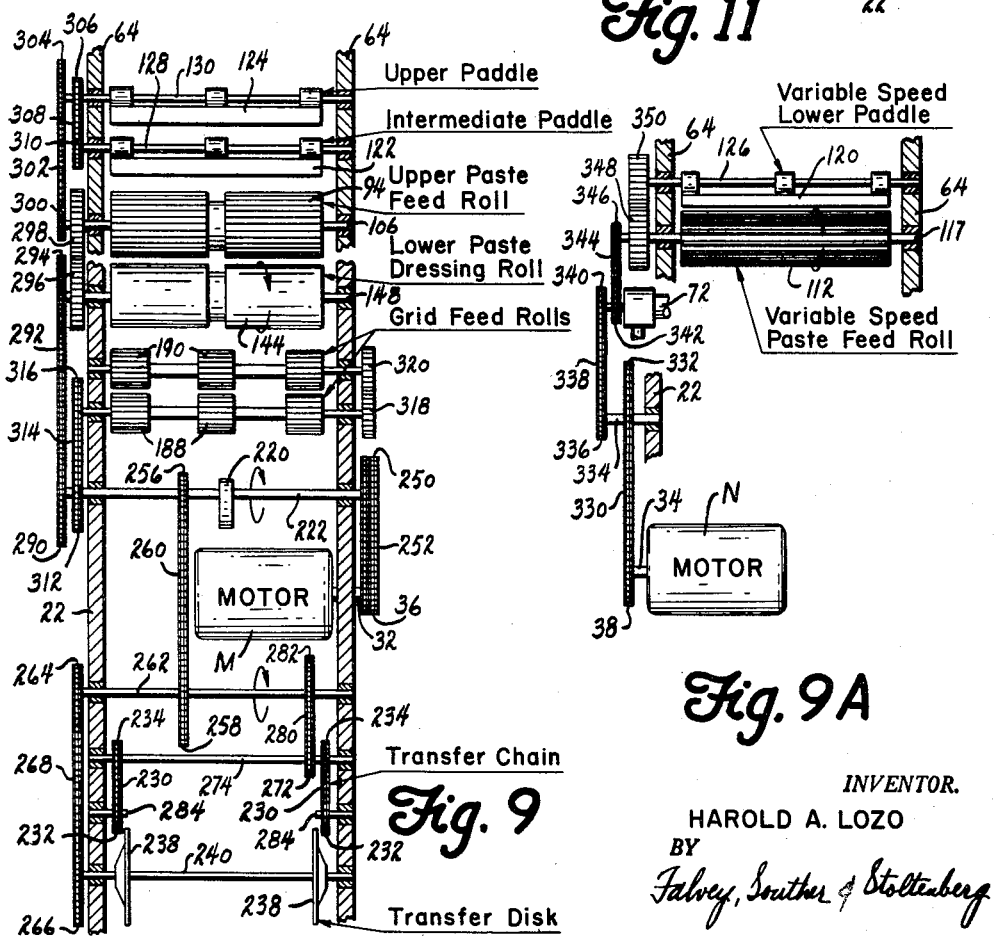

Aug. 23, 1960
H. A. LOZO
2,949,940
BATTERY PLATE PASTING MACHINE
Filed July 5, 1955
7 Sheets-Sheet 7
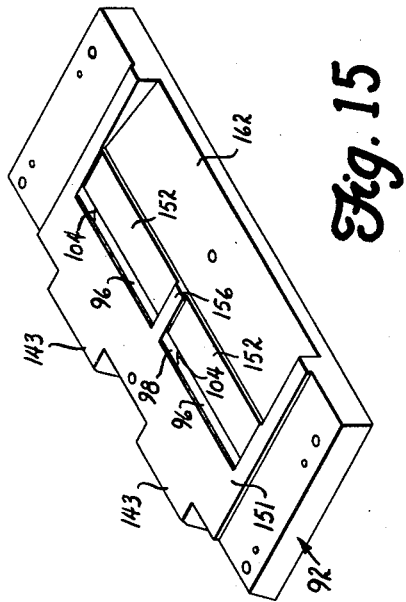
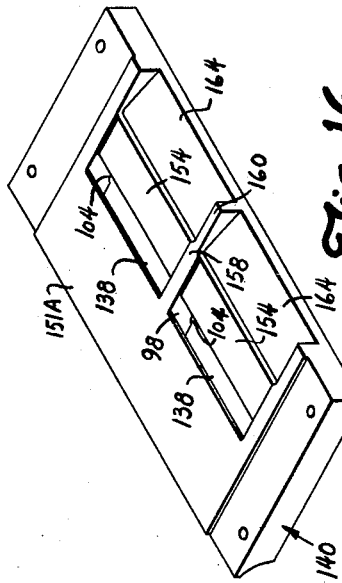
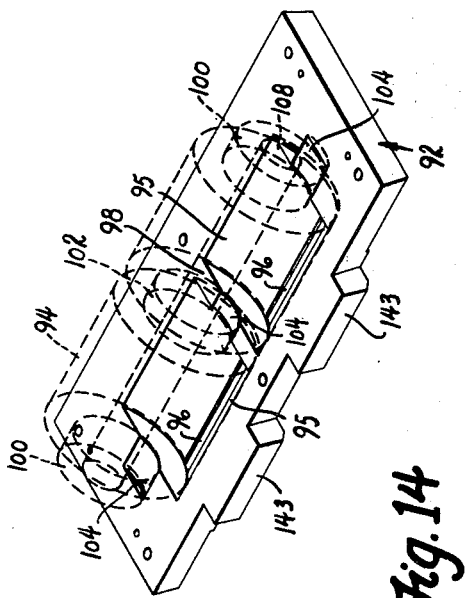
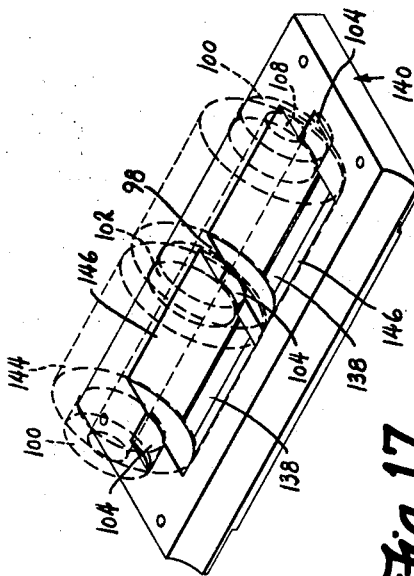
INVENTOR.
HAROLD A. LOZO
BY
Falvey, Souther & Stoltenberg United States Patent Office 2,949,940
Patented Aug. 23, 1960

2,949,940

BATTERY PLATE PASTING MACHINE

Harold A. Lozo, 148 Keil St., North Tonawanda, N.Y.

Filed July 5, 1955, Ser. No. 519,977

8 Claims. (Cl. 141—32)

This invention relates to pasting machines for positioning active materials on grids for use in storage batteries, more particularly to a pasting machine which is adapted to position paste on very thin grids.

The present trend in the manufacture of storage batteries for automotive use is to utilize the thinnest possible lead alloy grid which has positioned on it active materials to maintain the general dimensions of the grid to standard size whereby a greater amount of active material is placed upon the very thin grids to obtain the so-called "over-pasted" plates. To attain this purpose, special consideration must be given to the automatic means which positions to paste on these very thin grids, and this invention contemplates the provision of a pasting machine which is suitable for use in mass production to position the necessary active materials on the thin grids to maintain dimensional uniformity in the grids during manufacture. This problem necessitates a machine which is capable of controlling the amount of paste positioned on thin grids with great accuracy and, at the same time, provide means whereby sufficient support is supplied to the thin grids at all times during their movement through the pasting zone of the machine, so that the grids will not collapse or be distorted when passing through the pasting zone. Furthermore, due to the unavoidable variations in grid dimensions and in the consistency of the paste or active materials to be positioned thereon, a more accurate control is absolutely essential in the amount of paste being supplied by the machine in any instant.

In the past, the machines have not been provided with controls which provided the operator with a means to substantially instantly change the quantity of paste being positioned on the grids but there was provided only a general control which responded relatively slowly. The slow response of the machine to new requirements for paste often resulted in a number of grids being either over-pasted beyond the necessary tolerances, or under pasted, so that it was necessary to scrap those grids with the result that unnecessary scrap and production losses were found in the use of the machines in the prior art.

The present machine is provided with the necessary control over the paste-throwing mechanism of the pasting machine which allows the quantity of paste to be changed substantially instantly whereby the scrap could be limited to one plate if the discrepancy was noticed by the operator immediately. In other words, a machine has been provided with controls which allow the quantity of paste being positioned on a grid to be changed in the period while one grid is passing through the pasting zone of the machine.

It is, therefore, a principal object of this invention to provide a pasting machine for grids intended for use in storage batteries which allows substantially instantaneous control of the amount of paste being positioned on the grid passing through the pasting zone of the machine.

It is a further object of this invention to provide a machine which is capable of positioning active materials on a grid having a minimum thickness dimension to allow the so-called "over-pasting" of the grid.

It is a further object of this invention to provide a pasting zone for a pasting machine, which is provided with confining planar surfaces, preferably equally spaced a predetermined distance from each side of the grid immediately beyond the zone, the surfaces being provided to iron and smooth the outer surfaces of the paste which "sets" in the period the grids pass between the surfaces and provides also a means to control the amount of the "over-pasting" on each side of the grids to maintain substantially uniform dimensions.

It is a further object of this invention to provide a machine which is economical in operation on a mass production line so as to substantially obviate scrap in the pasting operation.

It is a further object of this invention to provide a pasting machine which will give support at all times to a very thin grid while the grid is passing through the pasting zone.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference character designate corresponding parts in the several views.

Referring to the drawings:

Fig. 1 is a side elevational view of the pasting machine wherein the grids are fed into the machine from the left side and issue from the machine in fully pasted condition on the right side;

Fig. 2 is an elevational view of a grid element consisting of two connected grids as pasted by the machine;

Fig. 2A is a sectional plan view of a portion of the grids showing the paste in position thereon;

Fig. 3 is a side elevational view of the machine taken from the opposite side of the view shown in Fig. 1;

Fig. 4 is an end elevation of a portion of the machine taken from the left side of Fig. 1;

Fig. 5 is an end elevational view taken from the right side of Fig. 1;

Fig. 6 is a side elevational view of a portion of the machine similar to Fig. 3 with the paste-containing hopper in raised position;

Fig. 7 is a plan view of a portion of the machine wherein the paste hopper is completely removed from the machine;

Fig. 8 is a sectional elevation taken from the same side as Fig. 1 showing the relation of the elements in the paste hopper in the pasting zone;

Fig. 9 is a schematic illustration of the power driving relations for the pasting rolls active in the pasting zone and their related parts;

Fig. 9A is a schematic illustration showing the driving relations of the upper paste-feeding roll which allows speed control thereof which is one of the features of the machine;

Fig. 10 is a plan view of a detail of an adjustable feature of the machine;

Fig. 11 is a sectional elevation of an adjustable feature of the machine taken along the line 11—11 of Fig. 10;

Fig. 12 is an elevational view of a detail of the conveyor chain incorporated in the machine;

Fig. 14 is an isometric view of the upper pasting feed roll with its cooperating plate forming a part of the pasting zone;

Fig. 15 is an inverted isometric view of the upper plate shown in Fig. 14;

Fig. 16 is an isometric view of the lower plate forming a part of the pasting zone, and Fig. 17 is an inverted isometric view of the lower plate shown in Fig. 16 with the lower smoothing roller in its inverted relative position.

Figure 13:
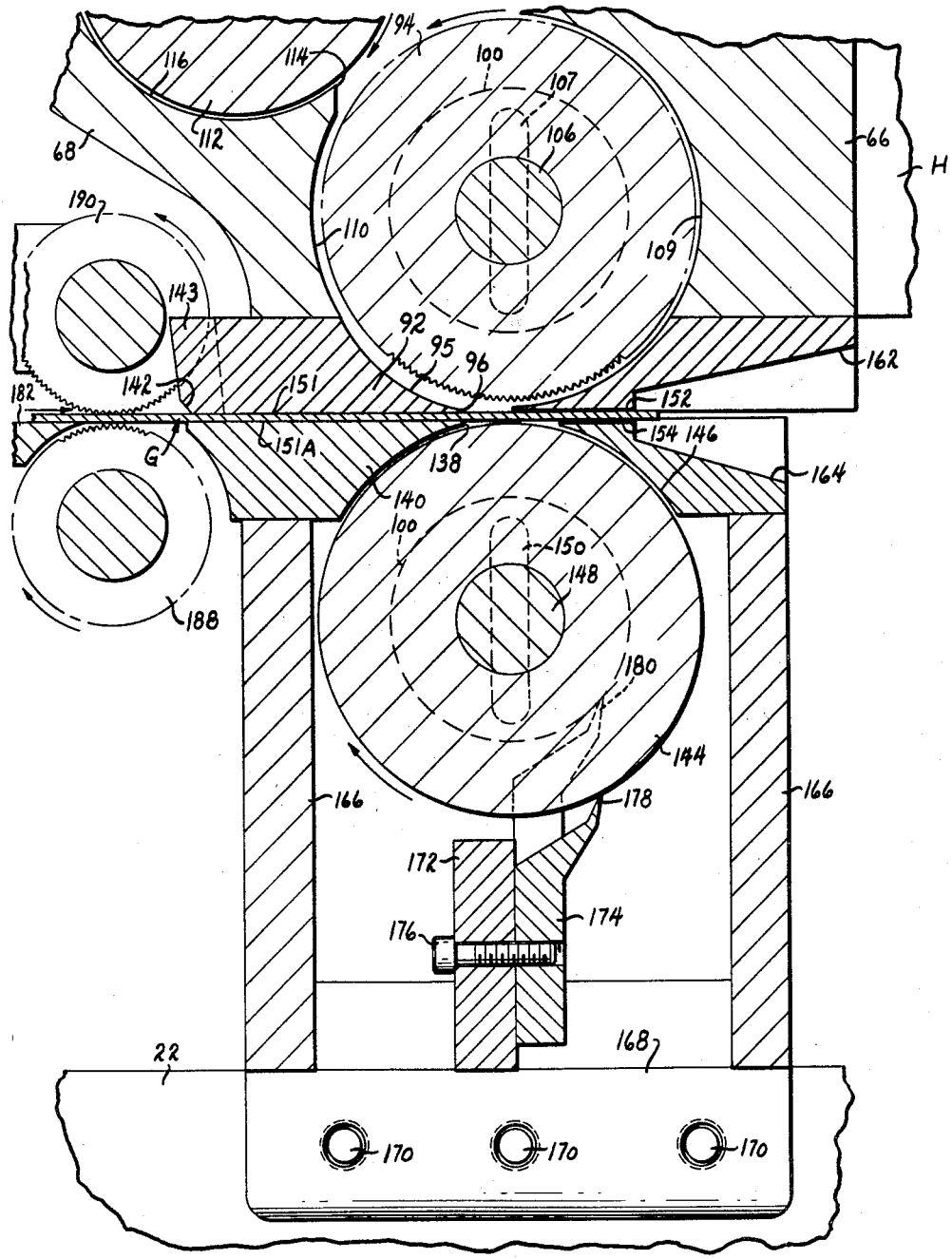
Fig. 13 is an enlarged sectional elevation of the parts adjacent the pasting zone.

Referring to the drawings, particularly to Fig. 1, a heavy cast metal frame-work is provided which may consist of lower elements 20 and upper elements 22, joined together at each side at a central horizonal plane by bolts 24 fitted conveniently through abutting flanges in both elements. The elements 20 and 22 are similar on each side of the final machine and are held in spaced parallel relation by plates 26 and 28 affixed to the lower elements 20 by screws 30 as shown. On the first plate 26, an electric motor M is attached in any well known manner as by bolts, while a second motor N is attached to the second plate 28, also by bolts, the motor including speed reduction elements and manual controls, as is well known. The projecting drive shafts 32 and 34 of the motors M and N project outwardly from the frame on opposite sides thereof, as is best seen in Fig. 5, which is a view taken from the right of Fig. 1. Sprockets 36 and 38 are affixed to the shafts 32 and 34 to drive the machine elements, as will be described hereinafter.

On the upper side of the upper frame members 22 on the left side, as seen in Fig. 1, a metal plate 40 is attached by screws 42 to the frame to form a working table for an operator to manipulate battery grids G to be placed in the machine for pasting, for which a magazine 44 is provided, as best seen in Figs. 1 and 7. The grid elements G are provided in connected pairs, as shown in Fig. 2, having lugs 46 extending laterally for convenience in moving by conveyors, as will appear hereinafter. The grids are supplied to the pasting machine incorporating the invention in the form shown in Fig. 2.

Behind the grid magazine 44 and to the right therefrom, as shown in Fig. 1, a paste hopper H is provided positioned above the upper frame member 22, to which it is attached by an adjustable pivot 48, affixed to the frame member. On the forward side of the hopper H, a bracket 50 is affixed to cooperate with an adjustable stop 52 mounted on a frame-work 54 projecting upwardly from the upper surface of the frame-work 22 to which it is affixed in any convenient manner. Projecting rearwardly from the upper portion of the hopper H, a bracket 56 is provided which is pivotally attached by link 58 to the piston rod 60 of an air cylinder 62 pivotally attached by ears on bracket 63 to the side of the frame at the rear of the machine, as is best seen in Figs. 3 and 4. By means of the air cylinder which retracts the piston rod 60 downwardly, the hopper H is moved about its pivot 48 to open the pasting zone for cleaning etc., as shown in Fig. 6. The air cylinder by suitable application of air pressure or air bleeding, controls the downward movement of the hopper H to return the hopper to its normal operating position, shown in Fig. 1.

The hopper H is constructed of plates, four of which are bolted together, as shown in Fig. 5, where the side plates 64 are of flat conformation and are bolted to central plates 66 and 68, whose inner surfaces are formed to cooperate with rollers and paddle wheels as will be further described hereinafter. The plate 66 is provided with ears 70 which are bored to fit pintles 72 pinned therein (Fig. 5) forming a part of the pivotal connection 48 for the hopper H, already described. The pintles extend outwardly on each side of the machine and are rotatably mounted in eyebolts 74 which have an enlarged cylindrical portion 76 adapted to slide in a vertical sleeve 78 affixed to the frame members on either sides, as shown in Fig. 5. The lower end 80 of the eyebolt is reduced in size and is threaded and provided with lock nuts 82, including a micrometer adjustment 84, to lock the bolt in vertical position with reference to a horizontally-disposed ear 86 affixed to the frame, so that the pivot pintle 72 can be moved vertically at will to provide an adjustment for the hopper position, which, in turn, controls the thickness at the pasting zone, to be described further. The hopper position is then determined by adjusting the locknuts 82 with reference to the ear 86 on one side of the hopper, while on the opposite side, the hopper position is controlled by the adjustable stop 52 already described. A manually controlled latch 88, including a locking toggle 90, is provided to hold the bracket 50 against the adjustable stop 52, the latch and toggle being mounted in relatively fixed position on the bracket 54, as shown.

The hopper H is provided with a bottom plate 92, attached thereto, by bolts in a conventional way, which is indented on its upper side to fit against the perimeter of a pasting roller 94, as is best seen in Fig. 14, which is a perspective view showing the roller 94 in operating position in phantom.

The roller 94, which is the principal pasting roller, has its outer surface knurled with a suitable pattern in a longitudinal direction, as is best seen in Fig. 13, so that a roughened surface is provided which facilitates movement of paste from the hopper into the indented portion 95 in the lower plate 92 of the pasting hopper H to issue from slots 96 which define the locus of the pasting zone as will be described further hereinafter. The indentation 95 in the upper surface of the plate 92 is divided into two principal portions which are coextensive with the slots 96, being divided by a central wall 98 which also separates the slots 96 into two portions, each of which is adapted to apply paste to the central gridded portion of the grid plates G, as shown in Fig. 2. The end portions 100 of the roller 94 and a central portion 102 are reduced in diameter to fit into indentations 104 located adjacent the opposite ends of the roller 94 and also the central wall portion 98 of the plate whereby relative seals are formed to prevent paste from escaping past the bearings formed in the side plates 64 with a central shaft 106 (Fig. 13) which fits into a longitudinal aperture 108 of the roller, being keyed thereto by pin 107 in a well known manner. The end surfaces of these end portions 100 are adapted to closely cooperate with the side plates 64 of the hopper to prevent the paste from entering bearings formed in the side plates for the shaft 106 which projects beyond the side plates, and is provided with a gear to form a driving relation as will be described further hereinafter.

Referring to Figs. 8 and 13, it will be noted that the indentation 95 in the upper surface of the plate 92 mounted on the bottom of the hopper H continues upwardly with correspondingly curved or arcuate surfaces 109 and 110 in side plates 66 and 68 of the hopper, so that the roller 94 is enclosed for a large portion of its perimetrical surface. The clearance between the roller 94 and the arcuate surface 109 in the rearward hopper side 66 is substantially smaller than that between the diametrically opposite side of the roller with the arcuate surface 110 in the forward hopper side 68. The clearance between the roller 94 and the surface 110 is an arcuate or cylindrical passageway for paste to pass in the form of a relatively thin ribbon from the hopper H above the roller 94 forwardly and downwardly with the rotation of the roller 94 in a counter-clockwise direction so as to force the paste through the pasting slot 96 located adjacent the lower side of the roller 94. To assist in moving the paste into the upper entrance of this passageway, an upper feed roller 112 is provided, preferably having a knurled surface and rotating in a clockwise direction or opposite from the rotation of the roller 94, as is best seen in Figs. 8 and 13. This crowds the paste into the entrance of the passageway formed between the indented surface 110 and the perimeter of the roller 94, the paste tending to be scraped from the smooth surface of the roller 112 by a sharp edge 114 formed adjacent the upper terminus of the surface 110 and substantially at its intersecting point with another arcuate surface 116 formed in the hopper side plate 68 which closely cooperates with the knurled perimeter of the roller 112.

The roller 112 is mounted on a transverse shaft 117 which is keyed thereto by pin 118 in a well known manner, the shaft 117 being journaled in bearings located in the side plates 64 of the hopper H. The shaft 117 extends beyond the outer surface of the hopper and is provided with a means for rotating the roller 112 which will be described further hereinafter when the driving means for the machine is described. Above the roller 112, three paste agitator paddles 120, 122, and 124 are provided, each being mounted on transverse shafts 126, 128, and 130 respectively, which are journaled in bearings positioned in the side plates 64 and which project beyond the side plates where they are provided with means for a driving relation as will be described hereinafter. The paddles are fixed to their respective shafts by being pinned thereto in the well known manner. The side plates 66 and 68 are provided with transverse enlargements 132, 134, and 136 which project inwardly toward the paddles approaching their orbits of rotation to assist in their action for moving the paste toward the rollers 94 and 112. The upper side of the hopper H is open so that an operator may manually replenish the supply of paste available for the operation of the machine. It will be noted that all of the paddles are constructed to rotate in a counter-clockwise direction which tends to urge the paste toward the opening between the two lowermost rollers 94 and 112 to facilitate the crowding of the paste into the passageway between the roller 94 and the cylindrical surface 110, already described, so that the paste will be urged through the pasting slot 96 in the lower plate 92 by the pasting rollers which provide means for feeding paste to the pasting zone for the grids as they pass through the machine.

Referring to Fig. 13, the pasting zone of the machine is composed of the slot 96 in the plate 92 attached to the lower side of the hopper H and also by a similar slot 138 in a lower plate 140 which is affixed in parallel relation to the upper plate 92 on the frame member. The lower slot 138 is substantially wider than the upper slot 96, through which the paste is forced by the pasting roller 94. The plates 92 and 140 are spaced apart a distance slightly larger than the thickness of the grid G, allowing for a slight tolerance which will allow the grid to readily pass between the plates by a pushing mechanism, which will be described hereinafter.

The grid G, in unpasted condition, consists of a cast lead-alloy framework, as is best seen in Fig. 2, which supports a number of intersecting wires within the framework substantially as shown. The boundary areas of the grid are preferably cast slightly over-size and, before the grids are placed in the pasting machine, they are subjected to a sizing operation wherein the grid passes between two revolving cutters which predetermines the thickness dimension of the grid to very close tolerances, so that in mass production a series of the grids may pass through the gap between the plates 92 and 140 without any substantial binding or buckling. It will be noted that the upper plate 92 is provided with a chamfered edge 142 on ears 143 projecting forwardly on its leading side which tends to guide the grids between the two plates.

The gap 138 in the lower plate 140 has cooperating with it a lower smoothing roller 144 which fits into an indented cylindrical surface 146 which communicates with the slot 138, as is best seen in Fig. 17, which shows the lower plate in inverted position to more clearly illustrate the cylindrical indentation 146 cooperating with the roller 144 which is shown in phantom. The roller 144 is provided with a smooth surface and is also provided with reduced portions similar to that described with reference to the upper pasting roller 94 which serve the same purpose and will not be described further. The smoothing roller 144 is mounted on a transverse shaft 148 to which it is keyed by pin 150. The shaft is suitably journaled in bearings affixed to the frame-work in a well known manner, and projects beyond the bearings to be provided with driving members which will be further described hereinafter.

The spacing between the plates 92 and 140 is manually adjustable by means including the adjustable pivot 48 and the adjustable stop 52, already described. The plates 92 and 140 are adjusted on their leading side (Fig. 13) to smoothly accommodate the grids G which are slid between them on surfaces 151 and 151A into the pasting zone, substantially defined by the gaps 96 and 138 in the upper and lower plates 92 and 140. The surfaces 151 and 151A both terminate at the gaps 96 and 138 in a leading edge. Both the upper and lower plates 92 and 140 are cut away beyond the slots 96 and 138 at their trailing edge to provide a pair of clearances undercut from surfaces 151 and 151A and, therefore, in different planes, which are bounded by plane surfaces 152 (Fig. 15) and 154 (Fig. 16) in the upper and lower plates respectively. The plane surfaces 152 and 154 are juxtaposed in parallel facing relation, as is best seen in Fig. 13, and provide a means which predetermines the amount and thickness of paste which will be positioned on each side of the grid passing through the pasting zone to control the so-called "over-pasting." The surfaces 152 and 154 cooperate with each other to this end and create a confining means or space which predetermines the amount of back pressure which may be built up in the pasting zone by the action of the feed rollers 94 and 112 which move the paste from the upper hopper through the slot 96 into the pasting zone. The space including the surface areas, and particularly the dimension of the surfaces 152 and 154 measured in the direction of movement of the grid, is important and is generally of the order of approximately four times the same dimension of the pasting slot 96. This relation, using paste having a normal consistency, provides a smooth, compact coating of paste of predetermined thickness on each side of the grid, which "sets" in the grid during its passage between the surfaces to prevent "spring back" and by their spatial dimension also predetermines the amount of "over-pasting" which may be applied to the grid plates. By "over pasting" is meant the amount of paste which is positioned on the grid, preferably uniformly on each side, over and above the thickness of the boundary portion of the grid which is cast, for purposes of economy, as thin as possible to reduce the amount of lead alloy therein, consistent with the mechanical strength and current-carrying capacity necessary for the production of a storage battery suitable for use in automobiles.

Each of the separate grids of a pair connected together for an element, as shown in Fig. 2, is subjected to the action of the cooperating ironing surfaces 152 and 154 which are each separated adjacent a central location by raised portions 156 and 158 of the plates 92 and 140 respectively, the lower plate being provided with an extension 160 which further supports the grids adjacent the cut-away section 162 in the upper plate. The cut-away sections 164 in the lower plate, as shown in Fig. 16, are divided by the projecting portion 160, just described. The purpose of the cut-away portions 162 and 164 is to relieve the pasted grids from being subjected to further drag after they have passed through the pasting zone and the region of the ironing surfaces 152 and 154.

The lower plate 140 is attached to a supporting means 166 by suitable bolts which is, in turn, attached at its lower end to the frame-work 22 by an integral cross bar 168 cooperating with bolts 170. Below the roller 144, a transverse bar 172 is provided forming a part of the supporting means 166 which has attached to it a doctor blade 174 by means of bolt 176 which has an upwardly projecting scraping edge 178 which removes surplus paste sticking to the smooth outer surface of the roller 144, so that it may drop by gravity to a convenient receptacle (not shown) provided to catch the waste paste. The central reduced portion of the roller is also provided with a secondary scraper 180 for the same purpose.

Grid-element advancing mechanism

As has already been described, the table 40 located on the forward side of the machine, as illustrated on the left in Fig. 1, is provided for an operator to manually manipulate battery grids, joined together in pairs for an element as shown in Fig. 2 to place the elements in a stack in magazine 44, shown in greater detail in Fig. 8. The lugs 46 of the grids G are placed forwardly in an angle bracket 180 substantially in the position as shown in plan view in Fig. 7. This feeds the grid elements vertically in a manner, so that the bottom grid element in the stack rests upon a frame member 182, the magazine member 180 being cut away adjacent the member 182 to provide a gap 184, through which the bottommost grid element is adapted to slide toward the pasting zone immediately below the hopper H for the pasting operation. In order to advance the bottommost grid element toward the pasting zone, a reciprocating slide member 186 is provided, movable in suitable guides to contact the forward bottom edge of the grid element distal from the lugs 46. The reciprocating slide member 186 advances the grid until it engages knurled rollers 188 and 190 which are power-driven by means to be described hereinafter, whereby a thrust is applied to the grid element to advance it into the slot formed between the spaced plates 92 and 140 (Fig. 13). The knurled portion of the rollers 188 and 190 are adapted to bite into the soft lead alloy of the grid element to give the rollers purchase to advance the grid element between the plates and into the pasting zone.

Referring to Fig. 7, it will be noted that the roller 188 is divided into three sections interfitting with ears 143 on the plate 92, the two outer sections contacting the outer frame members 192 of the grids, while the central portion of the roller is adapted to contact the adjoining portions 194 of the grid inasmuch as the wires of the grid G positioned within the outer frame portion are relatively weak mechanically and are usually positioned below or flush with the surface of the frame. No contact with them is made by the rollers, both rollers 188 and 190 being similar in this respect, which contact only the frame portion of the grid to advance the grid element into the pasting zone.

The upper knurled roller 190 is rotatably mounted on each end on arms 196 (Fig. 8) which are biased downwardly by springs 198 to rotate the arms about pivot pins 200. In order to limit the rotation of the arms 196 about the pivots 200, forwardly extending arm portions 202 are provided (Fig. 3) which contact adjustable stops 204 mounted on the inner side of the bracket member 54. The tension of the spring 198 is capable of being controlled by adjustable anchors 206 affixed to brackets 208 rigidly attached to the frame member in any convenient manner. The mechanism just described provides an adjustable anchoring means for the springs, against which they may react to bias the roller 190 downwardly into cooperation with the lower roller 188.

For reciprocating the slide member 186, a downwardly projecting ear 210 is provided, to which is rotatably attached a link 212 which, in turn, is rotatably attached to the upper end of an oscillating arm 214 (Fig. 3) attached to a transverse shaft 216 at its lower end which provides a pivot therefor. The shaft 216 is journaled in suitable bearings in the frame member 22. Intermediate the oscillating arm 214, an adjustable pitman 218 is provided to move the arm 214 and the transverse shaft 216 which, in turn, reciprocates the link 212 to move the slidable member 186 back and forth to advance the grid elements singly from the magazine 44 into the locus of the rollers 188 and 190 which, in turn, advance the grid elements into the pasting zone. The pitman 218 is reciprocated by means of a cam 220 which cooperates with an eye in the pitman, as is well known. The cam is fixed to shaft 222, being driven by motor M, as will be further described hereinafter.

After the grid elements are pushed partially through the pasting zone by the rollers 188 and 190, they lose contact with the rollers and will not be advanced further through the pasting zone until the next grid element is advanced by the slidable member 186 from the magazine into cooperative relation with the rollers 188 and 190. This new grid element pushes the previous grid element completely through the pasting zone until it clears the gap between the plates 92 and 140 where the grid element is picked up by the lugs 230A of conveyor chains 230, being moved by sprockets 232 and 234 (Fig. 1) adjustably mounted on elements to be described hereinafter. The adjustable feature allows an operator to control the spacing between the chains 230, to cooperate with different sizes of grid elements. The upstanding lugs 230a of the conveyor chains 230 are best seen in Fig. 12, being adapted to contact the lugs 46 in proper spaced relation on either side of the grid element to advance the grid elements to the right, as shown in Fig. 8. Suitable clearances are provided between the chains 230 mounted on each side of the machine, so that the grid element may change its position by having its one side dropped downwardly, as shown in an interim position in Fig. 8, where the bottom edge of the grid elements contacts a guide bar 236 which allows the grid gradually to assume a vertical relation as shown. The grid elements are advanced by the chains 230 until they contact by their lugs 46 transfer wheels 238 suitably mounted on a transverse shaft 240 driven by a means which will be further described hereinafter. After the grid elements contact the periphery of the transfer wheels 238, they proceed to other manufacturing procedures which do not form a part of this machine and will not be described. The grid elements may be advanced to a drying oven (not shown) if desired.

An adjustment for the spacing between the conveyor chains 230 at the sides of the machine is provided as shown in Figs. 10 and 11. A manually rotatable knob 241 having a threaded portion 241A, is fixed to a movable base member 242 by a plate 243 in which it is rotatable, to cooperate with a nut 244 fixed to the frame-work 22, as shown in Fig. 11. The base member 242 is attached to the frame-work by bolts 245, engaged in a slot 246 in the base member to allow adjustment when loosened, whereby movement is made possible by rotating the knob 241. The sprockets 232 and 234 are capable of being adjusted to different positions by movement of the base member 242, by their relatively fixed relation thereto. In the same manner, the transfer wheels are adjustable at the same time, also being relatively fixed to the base member but rotatable in a transverse plane.

Power-drive mechanism

As has already been described hereinbefore, the motor M is mounted on a plate 26 affixed to the lower portion of the frame member 20, being provided with a speed-reducing device which drives the sprocket 36 by shaft 32. The sprocket 36 drives a second larger sprocket 250 through the agency of a chain 252. Between the sprocket 250 and the shaft 222, already referred to in connection with the grid feeding mechanism, a friction clutch device 254 is provided which limits the transmission of torque from the motor M to the various elements of the machine. This clutch is in the nature of a safety device and will tend to slip when the power required to drive the machine exceeds a predetermined limit which could readily come about by hard lumps in the paste jamming the feed rolls in the hopper, or possibly by having a grid buckle in passing through the machine.

As already described, the shaft 222 extends transversely of the machine and has affixed to it, adjacent a central location, the cam 220 which drives the pitman 218 to reciprocate the sliding member which forms the pusher element of the grid feeding mechanism, already described. Slightly displaced from the cam 220, the shaft 222 is provided with a small sprocket 256 which drives a larger sprocket 258 located to the rear of the machine through the agency of a chain 260. The sprocket 258 is affixed to a transverse shaft 262 suitably journaled in the frame member 22 to project forwardly from the side of the machine, as shown in Fig. 3, being provided with a small sprocket 264, affixed to the projection of the shaft 262 to rotate therewith. The small sprocket 264 drives a larger sprocket 266 located further to the rear of the machine and above the shaft 262 by means of a chain 268. The sprocket 266 is affixed to another transverse shaft 240 which has positioned on it two large transfer discs 238, already described, with reference to the conveyor chains 230. The conveyor chains 230 are driven by a sprocket 234 which is slidably mounted on transverse shaft 274 suitably journaled in the adjustable base member 242 attached to the frame member 22 and forming a part thereof. The shaft 274 extends forwardly of the member 242 (Fig. 1) and is provided with a second sprocket which is engaged by a chain 280 which extends downwardly to engage a driving sprocket 282 affixed to the shaft 262. At the rear of the machine, the conveyor chains 230 engage idler sprockets 232 which are affixed to short stub shafts suitably affixed in portions of the base member 242.

Returning now to the main driving shaft 222, the opposite projecting end of the shaft, which is shown in Fig. 3, has affixed thereon a driving sprocket 290 which is engaged by a chain 292 to drive a second sprocket 294, affixed to the projecting end of the shaft 148, which is keyed to the lower smoothing roll 144, already described. The shaft 148 extends transversely of the machine and is provided with a driven gear 296 immediately behind the sprocket 294 as shown in Fig. 3. This gear engages another gear 298 affixed to the outer end of the shaft 106, which is keyed to the main paste feeding roll 94, already described. The engagement between these gears is broken when the hopper H is moved from operative position about the pivot pin 72 substantially as shown in Fig. 6 but when the hopper H is in normal operating position, as shown in Figs. 1 and 3, these gears are in mesh and form a driving relation between the rollers 144 and 94. The shaft 106 is also provided with a sprocket 300 located on the outside of the gear 298, as seen in Fig. 3. This sprocket is engaged by a chain 302 which drives another sprocket 304 affixed to the projecting end of the transverse shaft 130 of the paddle 124, as shown in Fig. 8. The shaft 130 is provided with another sprocket 306 which engages a chain 308 to drive a sprocket 310 positioned on the projecting end of the shaft 128 which drives the paddle 122.

Returning again to the main driving shaft 222, another sprocket 312 is attached to the projecting end of the shaft and engages a chain 314 which drives a sprocket 316 attached to the shaft of the lower feed roller member 188 which advances the grids into the pasting zone. At the opposite side of the machine, as shown in Fig. 1, the shaft of the roller 188 is provided with a gear 318 which engages another gear 320 affixed to the shaft of the upper roller 190, so that the rollers are geared together and rotate at substantially the same speed so as to advance the grid elements into the pasting zone. This completes the driving relations between the machine and the motor M.

The second motor N, which is mounted forwardly of the motor M (Fig. 1) on a second transverse plate 28 affixed to the lower frame member 20, has its driving shaft projecting in diametrically opposite relation with reference to motor M, substantially as shown in Fig. 3, and is provided with a speed-reducing device which drives shaft 34, to which is affixed pinion 38, as already described. The pinion 38 drives the chain 330 which engages a pinion 332 rotatably mounted on a stub shaft 334 affixed to the frame member 22. Forwardly of the sprocket 332, a second sprocket 336 is provided which is affixed to the sprocket 332 to be driven thereby. The sprocket 336 engages a chain 338 which drives a sprocket 340 journaled on an extending portion of the shaft 72 which forms the pivot for the hopper H when it is moved to its open position, as shown in Fig. 6, so that the driving relation is retained when in raised position. The sprocket 340 has attached to it a second sprocket 342 which engages chain 344 which drives a sprocket 346 attached to the shaft 118 driving the feed roller 112. Also affixed to the shaft 117 is a gear 348 which engages with a second gear 350 affixed to the projecting end of the shaft 126 which drives the paddle 120, already described. In this way, the motor N, whose speed is capable of being closely controlled by a rheostatic device controlled by a manual handle R, may quickly change the speed of rotation of the feed roller 112 and the cooperating paddle 120 without in any way interfering or changing the remaining elements of the machine.

This separate control of these two elements of the machine has the advantage that an operator can change the rate of feeding of paste to the pasting zone by increasing or decreasing the speed of rotation of the feed roller 112 and its cooperating paddle 120 substantially instantaneously and can thereby obviate the scrapping of grid plates which are not pasted in accordance with the required standard.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a grid pasting machine having a frame, a hopper for paste supported by the frame, a bottom wall for the the hopper provided with a transverse slot to provide a pasting zone, a pasting roller provided with a roughened continuous surface cooperating with the slot to force paste into and through the zone, a passageway below the wall for grids, means to move the grid through the passage-way, said passage-way being defined in part by a lower wall substantially parallel to the bottom wall of the hopper, a transverse slot in the lower wall opposite the slot in the bottom wall of the hopper, a smooth roller cooperating with the lower slot to smooth the paste on the lower side of the grid, an upper feed roller in the hopper cooperating with the pasting roller to feed paste to the pasting zone as a thin layer and means to selectively control the relative speed of the feed roller and the pasting roller.

2. In a grid pasting machine having a frame, a hopper for paste supported by the frame, a bottom wall for the hopper provided with a transverse slot to provide a pasting zone, a rotating pasting roller provided with a roughened continuous surface positioned closely to the trailing edge of the slot and in spaced relation with the leading edge of the slot to force paste into and through the zone, a passage-way below the wall for grids, means to move the grid through the passage-way, said passage being defined in part by a lower wall substantially parallel to the bottom wall of the hopper, a transverse slot in the lower wall opposite the slot in the bottom wall of the hopper, a smooth rotating roller cooperating with the lower slot to smooth the paste on the lower side of the grid, an upper rotating feed roller in the hopper cooperating with the pasting roller to feed paste to the pasting zone as a thin layer, and separate drive means to selectively control the relative rotative speed of the feed roller and the pasting roller.

3. In a grid pasting machine having a frame, a hopper for paste supported by the frame, a wall of the hopper being provided with a slot, a pasting roller provided with a roughened surface longitudinally continuous for the roller positioned in the slot to force paste into and through a pasting zone formed at the leading edge of the slot, a passage-way formed with the wall for grids, means to move the grid through the passage-way, said passage-way being defined in part by a second wall substantially parallel to the wall of the hopper, a transverse slot in the second wall opposite the slot in the wall of the hopper, a smooth roller positioned in the slot in the second wall to smooth the paste on the lower side of the grid, an upper feed roller in the hopper cooperating with the pasting roller to feed paste to the pasting zone as a thin layer, and means to control the relative rotative speed of the feed roller and the pasting roller.

4. In a grid pasting machine having a frame, a hopper for paste supported by the frame, a bottom wall for the hopper provided with a transverse slot facing upwardly provided with a cylindrical surface, a rotating pasting roller provided with a roughened continuous surface cooperating with the cylindrical surface of the slot to force paste into and through the slot adjacent one side thereof to provide a pasting zone, a passage-way below the wall for grids, means to move the grids through the passage-way, said passage being defined in part by a lower wall substantially parallel to the bottom wall of the hopper, a transverse slot in the lower wall opposite the slot in the bottom wall of the hopper including a downward facing cylindrical surface, a rotating smooth roller cooperating with the cylindrical surface of the lower slot to smooth the paste on the lower side of the grid, an upper rotating feed roller in the hopper cooperating with the rotating pasting roller to feed paste to the pasting zone as a thin layer, and separate drive means to control the relative rotative speed of the feed roller and the pasting roller.

5. A hopper for grid pasting machines, a bottom wall for the hopper having a transverse slot including an upwardly facing cylindrical surface forming a grid pasting zone, a rotating pasting roller cooperating with the transverse slot and spaced at least in part from the cylindrical surface to force paste to the pasting zone, a rotating feed roller cooperating with the pasting roller adjacent the terminus of the cylindrical surface to force paste into the space between the cylindrical surface and the rotating pasting roller, and means manually manipulatable to selectively vary the relative speeds of rotation of the rollers to control the quantity of paste supplied to the pasting zone.

6. A hopper for grid pasting machines, a wall for the hopper having a transverse slot including a symmetrically disposed cylindrical surface forming a grid pasting zone, a rotating pasting roller cooperating with the transverse slot and spaced from the leading side of the cylindrical surface to form a space through which paste is forced to the pasting zone, a rotating feed roller cooperating with the pasting roller adjacent the leading terminus of the cylindrical surface to force paste into the space between the surface and the pasting roller, and means manually manipulatable to control the relative speeds of rotation of the rollers to control the quantity of paste supplied to the pasting zone.

7. In a grid pasting machine, a hopper including a wall having a transverse slot with a symmetrically disposed cylindrical surface forming a grid pasting zone, a second wall in spaced cooperative relation to the first wall, pivot means for the hopper to allow raising of the hopper thereabout to expose the pasting side of the first wall, a rotating pasting roller cooperating with the transverse slot and spaced at least in part from the cylindrical surface to force paste to the pasting zone, a rotating feed roller cooperating with the pasting roller adjacent the terminus of the cylindrical surface to force paste into the space between the surface and the pasting roller, and means manually manipulatable to control the relative speeds of rotation of the rollers to control the quantity of paste supplied to the pasting zone.

8. In a grid pasting machine having a frame, a hopper for paste pivotally supported by the frame, adjustment means for the pivotal support to raise or lower the hopper, a bottom wall for the hopper provided with a transverse slot to provide a pasting zone, means to hold the hopper in a predetermined locked position, means to move the hopper about the pivotal support to expose the bottom wall, a pasting roller provided with serrations positioned in the slot to force paste into and through the zone, a passage-way below the wall for grids, means to move the grid through the passage-way, said passageway being defined in part by a lower wall substantially parallel to the bottom wall of the hopper, a transverse slot in the lower wall opposite the slot in the bottom wall of the hopper, a smooth roller cooperating with the lower slot to smooth the paste on the lower side of the grid, an upper feed roller in the hopper cooperating with the pasting roller to feed paste to the pasting zone as a thin layer, and separate drive means to control the relative rotative speed of the feed roller and the pasting roller.

References Cited in the file of this patent

UNITED STATES PATENTS

| | | |
|---|---|---|
| 1,975,039 | Goodrich | Sept. 25, 1934 |
| 2,212,070 | Luhrman | Aug. 20, 1940 |
| 2,290,288 | Mayer | July 21, 1942 |
| 2,680,547 | Donath | June 8, 1954 |